(12) United States Patent
Wegele

(10) Patent No.: US 10,077,819 B2
(45) Date of Patent: Sep. 18, 2018

(54) BLOCKING DEVICE FOR A SHOCK ABSORBER OF A MOTOR VEHICLE

(71) Applicant: AUDI AG, Ingolstadt (DE)

(72) Inventor: Alexander Wegele, Ingolstadt (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 15/424,262

(22) Filed: Feb. 3, 2017

(65) Prior Publication Data

US 2017/0225533 A1 Aug. 10, 2017

(30) Foreign Application Priority Data

Feb. 4, 2016 (DE) .................. 10 2016 001 235

(51) Int. Cl.
*F16F 9/58* (2006.01)
*B60G 17/005* (2006.01)

(52) U.S. Cl.
CPC .............. *F16F 9/58* (2013.01); *B60G 17/005* (2013.01); *B60G 2204/45* (2013.01)

(58) Field of Classification Search
CPC ...... F16F 9/58; B60G 17/005; B60G 2204/45
See application file for complete search history.

(56) References Cited

U.S. PATENT DOCUMENTS

| 2,047,590 | A | * | 7/1936 | Madsen | F16J 9/16 277/489 |
| 2,910,332 | A | * | 10/1959 | Madsen | F16J 9/14 277/446 |
| 6,439,578 | B1 | * | 8/2002 | Radcliffe | F16J 15/24 277/434 |
| 9,638,326 | B2 | * | 5/2017 | Haynes | F16J 15/26 |
| 2017/0016507 | A1 | * | 1/2017 | Funato | F16F 9/58 |
| 2017/0282664 | A1 | * | 10/2017 | Chambers | B60G 15/067 |

FOREIGN PATENT DOCUMENTS

| DE | 20215950 U1 * | 1/2003 | ............ F16F 1/376 |
| DE | 102006053298 A1 * | 5/2008 | .......... B60G 15/063 |
| DE | 10 2008 034 767 A1 | 2/2010 | |
| NL | 1038900 C * | 1/2013 | ............ B60G 11/54 |

* cited by examiner

*Primary Examiner* — Drew J Brown
(74) *Attorney, Agent, or Firm* — Henry M. Feiereisen LLC

(57) ABSTRACT

A blocking device for a shock absorber of a motor vehicle includes a first blocking member which has an insertion opening that is open-ended in a radial direction, for attachment of a piston rod of the shock absorber, and which has a receptacle. A second blocking member can be placed in a formfitting manner in the receptacle of the first blocking member in axial and radial directions to thereby close the insertion opening in the radial direction, while being held in the first blocking member.

11 Claims, 2 Drawing Sheets

BLOCKING DEVICE FOR A SHOCK ABSORBER OF A MOTOR VEHICLE

CROSS-REFERENCES TO RELATED APPLICATIONS

This application claims the priority of German Patent Application, Serial No. 10 2016 001 235.8, filed Feb. 4, 2016, pursuant to 35 U.S.C. 119(a)-(d), the disclosure of which is incorporated herein by reference in its entirety as if fully set forth herein.

BACKGROUND OF THE INVENTION

The present invention relates to a blocking device for a shock absorber of a motor vehicle.

The following discussion of related art is provided to assist the reader in understanding the advantages of the invention, and is not to be construed as an admission that this related art is prior art to this invention.

DE 10 2008 034 767 A1 discloses a blocking device for a suspension strut of a motor vehicle, whereby two identical blocking members are axially coupled to one another and secured against rotation via complementing projections and recesses. This type of blocking device has shown to be inferior because in certain situations the blocking members can spontaneously detach from one another, causing the blocking device to separate. This can cause damage, e.g. when shipping a new vehicle.

It would therefore be desirable and advantageous to address this problem and to provide an improved blocking device for a shock absorber of a motor vehicle to obviate other prior art shortcomings.

SUMMARY OF THE INVENTION

According to one aspect of the present invention, a blocking device for a shock absorber of a motor vehicle includes a first blocking member an insertion opening, which is open-ended in a radial direction, for attachment of a piston rod of the shock absorber, the first blocking member having a receptacle, and a second blocking member configured for formfitting placement in the receptacle of the first blocking member in axial and radial directions to thereby close the insertion opening in the radial direction, while being held in the first blocking member.

A blocking device in accordance with the present invention has the advantage that the first and second blocking members are formfittingly connected to one another in both axial and radial directions. The possibility of an inadvertent separation of the two blocking members is effectively eliminated. Since the second blocking member is held formfittingly in axial and radial directions in the first blocking member so that the height of the blocking members have no adverse effect on the closure of the two blocking members, a modular configuration of the blocking device can be realized by simply changing the size of the recesses. In other words, through respective adjustment of the height of the blocking members and/or size of the insertion opening, a blocking device according to the present invention is applicable for a wide range of vehicles and installed shock absorbers with different spring deflections, i.e. piston rod travel, trim position, and piston rod diameter (single-tube shock absorber, twin-tube shock absorber). Another benefit of a blocking device according to the present invention is its stackability to any height.

According to another advantageous feature of the present invention, the first blocking member can include a first locking element and the second blocking member can include a second locking element for engagement in the first locking element of the first blocking member, when the second blocking member is inserted in the first blocking member to thereby inhibit a movement of the first and second blocking members in relation to one another. As a result, the first and second blocking members are held captive on one another, so that inadvertent detachment of the blocking members is even less likely.

According to another advantageous feature of the present invention, the second blocking member can also have an insertion opening, which is open-ended in the radial direction, for attachment to the piston rod.

According to another advantageous feature of the present invention, the receptacle of the first blocking member can be configured to receive the second blocking member as the second blocking member is moved in an axial direction, with the first and second locking elements engaging with one another when the first and second blocking members are rotated relative to one another. As a result of the concentric arrangement of the first and second blocking members relative to one another, a compact structure is advantageously ensured.

According to another advantageous feature of the present invention, one of the first and second blocking members can have an axial guide groove for engagement of a complementary guide lug on the other one of the first and second blocking members. In this way, the first and second blocking members are aligned to one another and axial insertion of the second blocking member in the first blocking member is simplified.

According to another advantageous feature of the present invention, the axial guide groove can transition into a groove which receives the guide lug and has a closed configuration in circumferential and axial directions, with the groove having an ascending wedge-shape ramp, so that the guide lug is fixed against rotation by a sidewall of the ramp, when the guide lug has moved past the ramp. This configuration is beneficial because the guide lug not only is able to assist in the alignment of the first and second blocking members but also to establish the anti-rotation feature and securement of the blocking members in combination with the sidewall of the ramp as a locking element.

According to another advantageous feature of the present invention, the guide lug and the ramp can be configured in the groove such as to establish a clearance fit between the guide lug and the ramp at a highest point of the ramp. This enables easy separation of the blocking members that requires no force, because the formfit is attained by gravity, when the second blocking member has moved past the ramp and is held against the wedge-shaped ramp. Release of the second blocking member is simple and merely requires lifting of the second blocking member in relation to the wedge-shaped ramp and twisting of the second blocking member back to the initial position.

According to another advantageous feature of the present invention, the first and second blocking members can have a cylindrical shape. This ensures a particular compact structure.

According to another advantageous feature of the present invention, the second blocking member can have a rod-shaped configuration, with the receptacle of the first blocking member being configured in the form of two through openings which are closed in the axial direction and arranged in relation to one another such that the second blocking member is insertable in the first blocking member by a movement which is directed substantially tangential with respect to the piston rod of the shock absorber, with the first and second locking elements engaging one another, when the second blocking member is fully inserted in the first blocking member. As a result of this configuration, only one of the blocking members, i.e. the first blocking member, needs to be pushed onto the piston rod of the shock absorber. This ensures quick and simple installation of the blocking device.

According to another advantageous feature of the present invention, the second locking element of the second blocking member can be configured at an end of the second blocking member in the form of an ascending wedge-shaped safeguard having a sidewall which is held against a retention edge formed on a corresponding one of the through openings, when the second blocking element is fully inserted into the first blocking member. This establishes the anti-rotation feature or securement of the blocking members to one another.

According to another advantageous feature of the present invention, the first blocking member can be cylindrical in shape and the second blocking member can have a curved configuration. This advantageously simplifies insertion of the second blocking member in the first blocking member.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
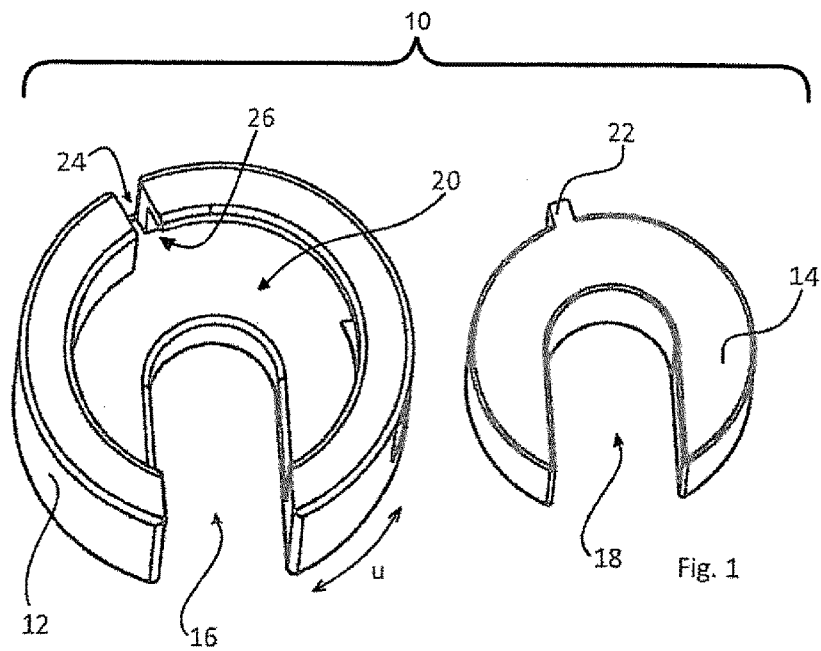
FIG. 1 is an exploded top perspective view of first and second blocking members of a first embodiment of a blocking device according to the present invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments may be illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown an exploded top perspective view of a first embodiment of a blocking device according to the present invention, generally designated by reference numeral 10, for a shock absorber of a motor vehicle. For convenience and sake of simplicity, FIG. 1 and the following description refer only to those components of the blocking device that form part of the present invention. A detailed description and illustration of a shock absorber, including a piston rod thereof, has therefore been omitted for sake of simplicity.

Figure 2:
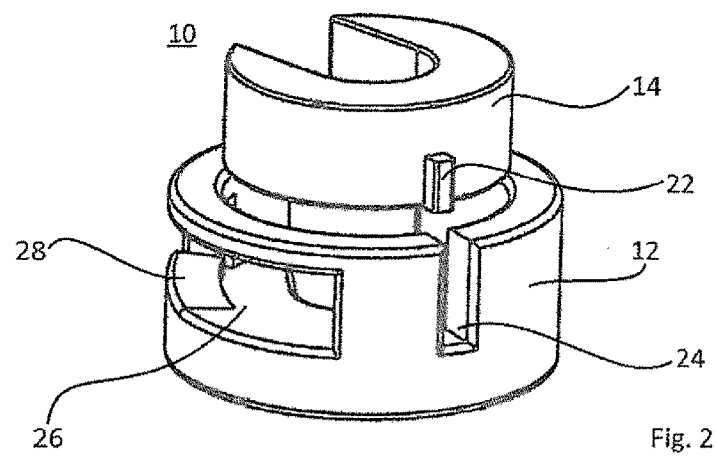
FIG. 2 is a perspective view of the first and second blocking members just before being joined together.
Figure 3:
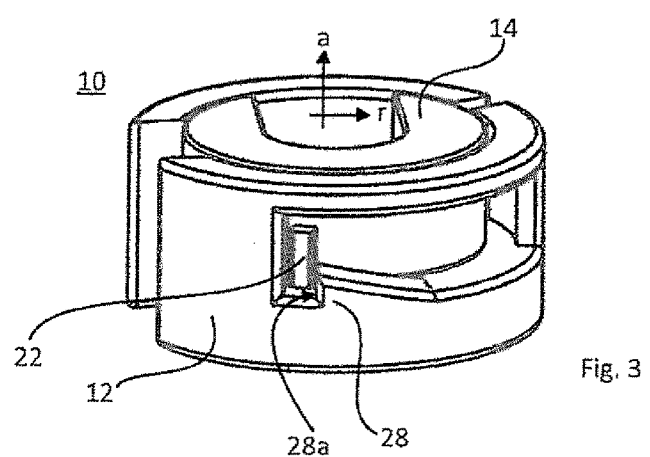
FIG. 3 is a perspective view of the first and second blocking members after being joined together.

The blocking device 10 includes a first blocking member 12 and a second blocking member 14, shown also in FIGS. 2 and 3 in partly assembled state and fully assembled state, respectively, in the non-limiting example shown here, the first and second blocking members 12, 14 are cylindrical in shape and have each an insertion opening 16, 18 which is open-ended in radial direction r (FIG. 3) to allow attachment of the piston rod of the shock absorber.

As is readily apparent from FIG. 1, the first blocking element 12 includes in axial direction a (FIG. 3) a receptacle in the form of a blind hole. The receptacle 20 and the second blocking member 14 are configured such that the second blocking member 14 can be inserted coaxially in the first blocking member 12, as clearly shown in FIG. 2.

To align the first and second blocking members 12, 14 with one another so that the insertion openings 16, 18 are in coincidence to enable placement of the blocking device 10 in its entirety over the piston rod, the second blocking member 14 is formed with a guide lug 22. Complementing the guide lug 22 is a guide groove 24 which is formed on the first blocking member 12 and oriented in the axial direction a.

As is apparent from FIGS. 1 to 3, the guide groove 24 transitions into a groove 26 which extends in a circumferential direction u and in the axial direction a. As best seen in FIG. 3, the groove 26 is formed with an ascending wedge-shaped ramp 28.

To hold the first and second blocking members 12, 14 captive on one another, the first and second blocking members 12, 14, after being assembled, are rotated relative to one another until the guide lug 22 moves past the wedge-shaped ramp 22 and rests against a sidewall 28a of the wedge-shaped ramp 28. This is shown in FIG. 3. Both insertion openings 16, 18 have shifted relative to one another and the blocking device 10 is secured by a formfit upon the piston rod. The wedge-shaped ramp 28 renders hereby an inadvertent reverse rotation impossible, unless a force is applied which, however, is normally not encountered, when a vehicle is shipped for example.

As a result of the formfitting arrangement of the second blocking member 14 in the first blocking member 12 and the provision of the anti-rotation feature to maintain integrity of the assembled state, as realized by the interaction between the guide lug 22 and the wedge-shaped ramp 28, inadvertent detachment of the blocking device 10 from the piston rod is effectively prevented.

Furthermore, the guide lug 22 and the wedge-shaped ramp 28 are formed in the groove 26 such that a clearance fit between the guide lug 22 and the wedge-shaped ramp 28 is established at a highest point of the wedge-shaped ramp 28. As a result, the first and second blocking members 12, 14 can be separated absent any force application. The formfit is realized solely by gravity, when the second blocking member 14 drops behind the wedge-shaped ramp 28, after having moved past the wedge-shaped ramp 28. To separate the first and second blocking member 12, 14, it is merely required to lift the second blocking device 14 relative to the wedge-shape ramp 28 and to rotate it back to its initial position.

Figure 4:
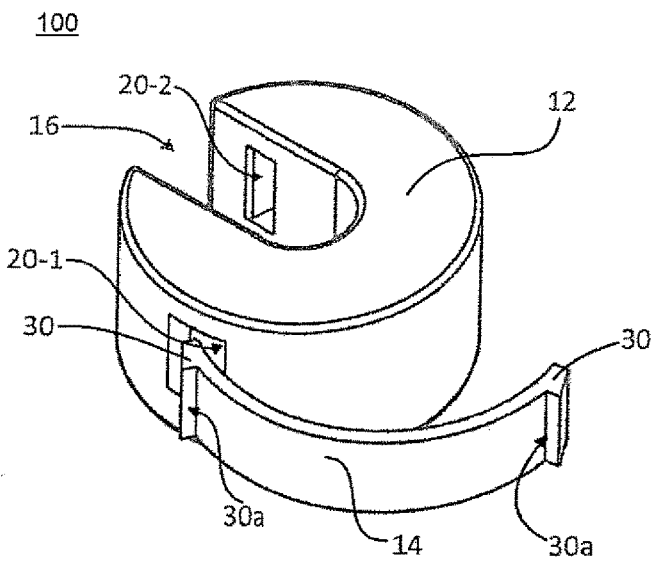
FIG. 4 is a top perspective view of first and second blocking members of a second embodiment of a blocking device according to the present invention.

Referring now to FIG. 4, there is shown a top perspective view of a second embodiment of a blocking device according to the present invention, generally designated by reference numeral 100. Parts corresponding with those in FIG. 1 are denoted by identical reference numerals and not explained again. The description below will center on the differences between the embodiments. Again, for sake of simplicity, the shock absorber and its piston rod are not shown. In this embodiment, provision is made for a second blocking member 14 which has a curved rod-shaped configuration. The first blocking member 12 is still cylindrical in shape and includes the insertion opening 16 which is open-ended in the radial direction r for attachment of the piston rod.

Figure 5:
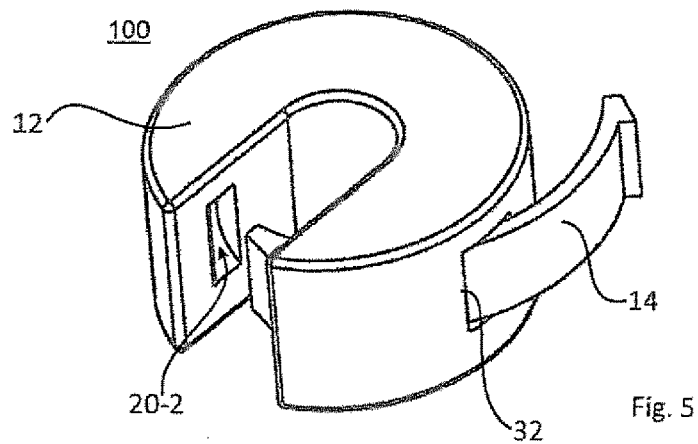
FIG. 5 is a perspective view of the first and second blocking members of FIG. 4 in partly joined state.
Figure 6:
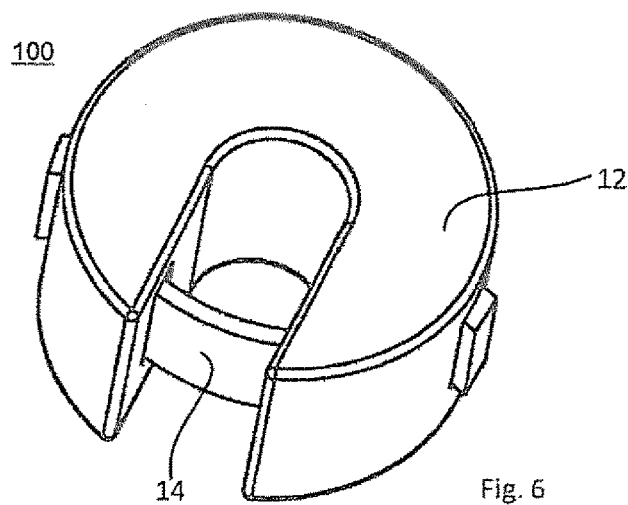
FIG. 6 is a perspective view of the first and second blocking members of FIG. 4 after being joined together.

As is apparent from FIG. 4, the receptacle 20 of the first blocking member 12 is here formed by two through openings 20-1, 20-2 which are closed in the axial direction a. The through openings 20-1, 20-2 are hereby aligned in such a way that the rod-shaped second blocking member 14 can be inserted into the first blocking member 12 in a movement which is directed substantially tangentially in relation to the piston rod of the shock absorber. This is shown in FIG. 5. After the second blocking member 14 has been inserted in the first blocking member 12, the second blocking member 14 is held in the first blocking member 12 by a formfit in axial direction a and radial direction r, while the insertion opening 16 is thereby closed in the radial direction r. This is readily apparent from FIG. 6.

To hold the first and second blocking members captive and to provide an anti-rotation feature, the rod-shaped second blocking member 14 has end regions which are each formed with an ascending wedge-shaped safeguard 30 (FIG. 4) in the form of a sidewall 30a. After the second blocking member 14 has been fully inserted in the first blocking member 12, the sidewalls 30a of the safeguards 30 are held in place by retention edges 32, respectively formed at the through openings 20-1 and 20-2.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A blocking device for a shock absorber of a motor vehicle, said blocking device comprising:
    a first blocking member having an insertion opening, which is open-ended in a radial direction, for attachment of a piston rod of the shock absorber, said first blocking member having a receptacle; and
    a second blocking member configured for insertion in coaxial relationship in the receptacle of the first blocking member and for formfitting placement in axial and radial directions to thereby close the insertion opening in the radial direction, while being held in the first blocking member.

2. The blocking device of claim 1, wherein the first blocking member includes a first locking element and the second blocking member includes a second locking element for engagement in the first locking element of the first blocking member, when the second blocking member is inserted in the first blocking member to thereby inhibit a movement of the first and second blocking members in relation to one another.

3. The blocking device of claim 2, wherein the receptacle of the first blocking member is configured to receive the second blocking member as the second blocking member is moved in an axial direction, with the first and second locking elements engaging with one another when the first and second blocking members are rotated relative to one another.

4. The blocking device of claim 1, wherein the second blocking member has an insertion opening, which is open-ended in the radial direction, for attachment to the piston rod.

5. The blocking device of claim 1, wherein one member selected from the group consisting of the first blocking member and the second blocking member has an axial guide groove for engagement of a complementary guide lug on the other member of the group.

6. The blocking device of claim 5, wherein the axial guide groove transitions into a groove which receives the guide lug and has a closed configuration in circumferential direction and in an axial direction, said groove having an ascending wedge-shape ramp, so that the guide lug is fixed against rotation by a sidewall of the ramp, when the guide lug has moved past the ramp.

7. The blocking device of claim 6, wherein the guide lug and the ramp are configured in the groove such as to establish a clearance fit between the guide lug and the ramp at a highest point of the ramp.

8. The blocking device of claim 1, wherein the first and second blocking members have a cylindrical shape.

9. A blocking device for a shock absorber of a motor vehicle, said blocking device comprising:
    a first blocking member having an insertion opening, which is open-ended in a radial direction, for attachment of a piston rod of the shock absorber, said first blocking member having a receptacle, said first blocking member including a first locking element; and
    a second blocking member configured for formfitting placement in the receptacle of the first blocking member in axial and radial directions to thereby close the insertion opening in the radial direction, while being held in the first blocking member, said second blocking member including a second locking element for engagement in the first locking element of the first blocking member, when the second blocking member is inserted in the first blocking member to thereby inhibit a movement of the first and second blocking members in relation to one another,
    wherein the second blocking member has a rod-shaped configuration, said receptacle of the first blocking member being configured in the form of two through openings which are closed in the axial direction and arranged in relation to one another such that the second blocking member is insertable in the first blocking member by a movement which is directed substantially tangential with respect to the piston rod of the shock absorber, said first and second locking elements engaging one another, when the second blocking member is fully inserted in the first blocking member.

10. The blocking device of claim 9, wherein the second locking element of the second blocking member is configured at an end of the second blocking member in the form of an ascending wedge-shaped safeguard having a sidewall which is held against a retention edge formed on a corresponding one of the through openings, when the second blocking element is fully inserted into the first blocking member.

11. The blocking device of claim 9, wherein the first blocking member is cylindrical in shape and the second blocking member has a curved configuration.

\* \* \* \* \*